(12) United States Patent
Frehland

(10) Patent No.: US 9,273,564 B2
(45) Date of Patent: Mar. 1, 2016

(54) DEVICE FOR DRIVING AN AUXILIARY UNIT

(71) Applicant: Bayerische Motoren Werke Aktiengesellschaft, Munich (DE)

(72) Inventor: Peter Frehland, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/675,595

(22) Filed: Nov. 13, 2012

(65) Prior Publication Data

US 2013/0071233 A1 Mar. 21, 2013

Related U.S. Application Data

(63) Continuation of application No. PCT/EP2011/001746, filed on Apr. 8, 2011.

(30) Foreign Application Priority Data

May 14, 2010 (DE) .......................... 10 2010 020 578

(51) Int. Cl.
| | |
|---|---|
| F01D 15/08 | (2006.01) |
| F02B 67/04 | (2006.01) |
| F16D 1/10 | (2006.01) |
| F16D 3/06 | (2006.01) |
| F01D 15/00 | (2006.01) |
| F01L 1/047 | (2006.01) |

(52) U.S. Cl.
CPC .............. *F01D 15/08* (2013.01); *F01D 15/00* (2013.01); *F01L 1/047* (2013.01); *F02B 67/04* (2013.01); *F16D 1/101* (2013.01); *F16D 3/06* (2013.01); *F16D 2001/102* (2013.01); *F16D 2001/103* (2013.01)

(58) Field of Classification Search
USPC .............. 403/292, 298, 300, 301, 308, 359.1, 403/365, 383; 123/179.17, 450, 509
See application file for complete search history.

(56) References Cited

U.S. PATENT DOCUMENTS

| 2,829,630 A | | 4/1958 | K. Ziesche et al. |
|---|---|---|---|
| 5,078,114 A | * | 1/1992 | Haag et al. .................... 123/450 |
| 5,558,456 A | * | 9/1996 | Nakase et al. ............. 403/359.1 |

(Continued)

FOREIGN PATENT DOCUMENTS

| CN | 201236730 Y | 5/2009 |
|---|---|---|
| CN | 101636579 A | 1/2010 |

(Continued)

OTHER PUBLICATIONS

English translation of Chinese Office Action dated Mar. 3, 2014 {Two (2) pages}.

(Continued)

*Primary Examiner* — Daniel Wiley
(74) *Attorney, Agent, or Firm* — Crowell & Moring LLP

(57) ABSTRACT

A device for driving an auxiliary unit, in particular a high-pressure pump is provided. The device includes a rotatably supported drive shaft of an internal combustion engine coupled to a unit shaft of the auxiliary unit by a coupling. The unit shaft has a first bearing on the side facing away from the coupling, and a second bearing formed by the coupling. The device provides a coupling solution for connecting, for example, a high-pressure pump camshaft to an available intake or exhaust camshaft.

8 Claims, 2 Drawing Sheets

(56) References Cited

U.S. PATENT DOCUMENTS

| | | | |
|---|---|---|---|
| 6,330,876 B1 * | 12/2001 | Spinnler et al. | 123/456 |
| 6,425,749 B1 | 7/2002 | Lettner et al. | |
| 6,641,322 B2 * | 11/2003 | Narasimhan et al. | 403/29 |
| 6,709,234 B2 * | 3/2004 | Gilbert et al. | 415/200 |
| 6,766,716 B1 * | 7/2004 | Lee | 81/60 |
| 6,769,413 B2 * | 8/2004 | Ishimoto | 123/509 |
| 6,866,025 B1 * | 3/2005 | Maass | 123/450 |
| 7,007,574 B1 * | 3/2006 | Wu | 81/177.85 |
| 7,051,706 B2 * | 5/2006 | Tanaka et al. | 123/357 |
| 7,152,585 B2 * | 12/2006 | Tanaka | 123/500 |
| 7,284,537 B2 * | 10/2007 | Kleinbeck et al. | 123/450 |
| 7,628,142 B2 * | 12/2009 | Hayman et al. | 123/509 |
| 2009/0010708 A1 * | 1/2009 | Kroener | 403/333 |
| 2009/0084360 A1 * | 4/2009 | DePayva et al. | 123/509 |
| 2010/0101539 A1 | 4/2010 | Meier et al. | |

FOREIGN PATENT DOCUMENTS

| | | |
|---|---|---|
| DE | 579 859 | 7/1933 |
| DE | 917 520 | 9/1954 |
| DE | 1 091 381 | 10/1960 |
| DE | 2 121 275 | 12/1971 |
| DE | 198 02 031 A1 | 7/1999 |
| DE | 199 14 269 A1 | 10/2000 |
| DE | 102 14 790 A1 | 10/2003 |
| DE | 10 2007 029 651 A1 | 1/2009 |
| DE | 10 2007 029 965 A1 | 1/2009 |
| DE | 10 2008 024 532 A1 | 11/2009 |
| DE | 10 2008 056 773 A1 | 5/2010 |
| EP | 0 985 815 A2 | 3/2000 |
| GB | 729015 | 4/1955 |
| GB | 730644 | 5/1955 |
| JP | 8-226451 A | 9/1996 |
| WO | WO 86/00665 A1 | 1/1986 |

OTHER PUBLICATIONS

English translation of Chinese Office Action dated Nov. 15, 2014 (Six (6) pages).

English translation of Chinese Office Action dated May 21, 2015 (six pages).

* cited by examiner

DEVICE FOR DRIVING AN AUXILIARY UNIT

CROSS REFERENCE TO RELATED APPLICATIONS

This application is a continuation of PCT International Application No. PCT/EP2011/001746, filed Apr. 8, 2011, which claims priority under 35 U.S.C. §119 from German Patent Application No. 10 2010 020 578.8, filed May 14, 2010, the entire disclosures of which are herein expressly incorporated by reference.

BACKGROUND AND SUMMARY OF THE INVENTION

The invention relates to a device for driving an auxiliary unit, particularly a high-pressure pump wherein a rotatably disposed drive shaft of an internal-combustion engine and a unit shaft of the auxiliary unit are in a mutually operative position by way of a coupling.

Concerning the technical background, reference is made, for example, to German Published Patent Application DE 10 2007 029 651 A1, from which a high-pressure fuel pump arrangement having a pump housing is known for operating a self-igniting internal-combustion engine. This high-pressure fuel pump arrangement has a low-pressure and a high-pressure circulation system and a valve camshaft disposed in a cylinder head of the internal-combustion engine, by which valve camshaft the high-pressure fuel pump arrangement can be driven. The valve camshaft further has a polygonal construction, and components of the high-pressure fuel pump arrangement are advantageously integrated in the cylinder head of the internal-combustion engine.

Furthermore, reference is made to German Published Patent Application DE 10 2008 024 532 A1, on which the present invention is based.

From German Patent Document DE 10 2008 024 532 A1, a device is known for driving an auxiliary unit, particularly a high-pressure pump of an internal-combustion engine. For this purpose, the device has a rotatably disposed driveshaft, preferably a camshaft of the internal-combustion engine. The driveshaft and a unit shaft of the auxiliary unit are in a mutually operative connection by way of a coupling. In a preferred and known manner, this coupling is a jaw coupling.

Such a device of the above-mentioned type for driving an auxiliary unit is, however, acoustically conspicuous, i.e. loud, sensitive to tolerance, expensive, and subject and sensitive to wear in the case of high alternating torques.

It is therefore an object of the present invention to avoid the above-mentioned disadvantages of the known devices.

This and other objects are achieved by a device for driving an auxiliary unit, particularly a high-pressure pump wherein a rotatably disposed drive shaft of an internal-combustion engine and a unit shaft of the auxiliary unit are in a mutually operative position by way of a coupling. The unit shaft has a first bearing on the side facing away from the coupling, and the coupling forms a second bearing for the unit shaft.

The further development according to the invention represents a cost-efficient, acoustically inconspicuous coupling solution that is insensitive to tolerance for connecting, for example, a high-pressure pump camshaft to an existing intake or exhaust camshaft or any other shaft.

In a further development, the coupling consists of a shaft end with an interior profile which engages a complementary shaft end of the unit shaft with an exterior profile. Particularly preferably, the interior profiling and the exterior profiling are polygonal profiles. These further developments are particularly preferred embodiments which can be manufactured in a simple and cost-effective manner and are very advantageous acoustically.

In a further development, at least one of the drive shaft and the unit shaft has at least one cam that generates an alternating torque during operation of the device. The polygonal profile corresponds to the alternating torque. These further developments again has a particularly advantageous effect on the acoustic features.

By means of a further development wherein the shaft end with the exterior profile has a circumferential radius in the axial direction, an axial and angular tolerance compensation becomes possible for the unit shaft.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
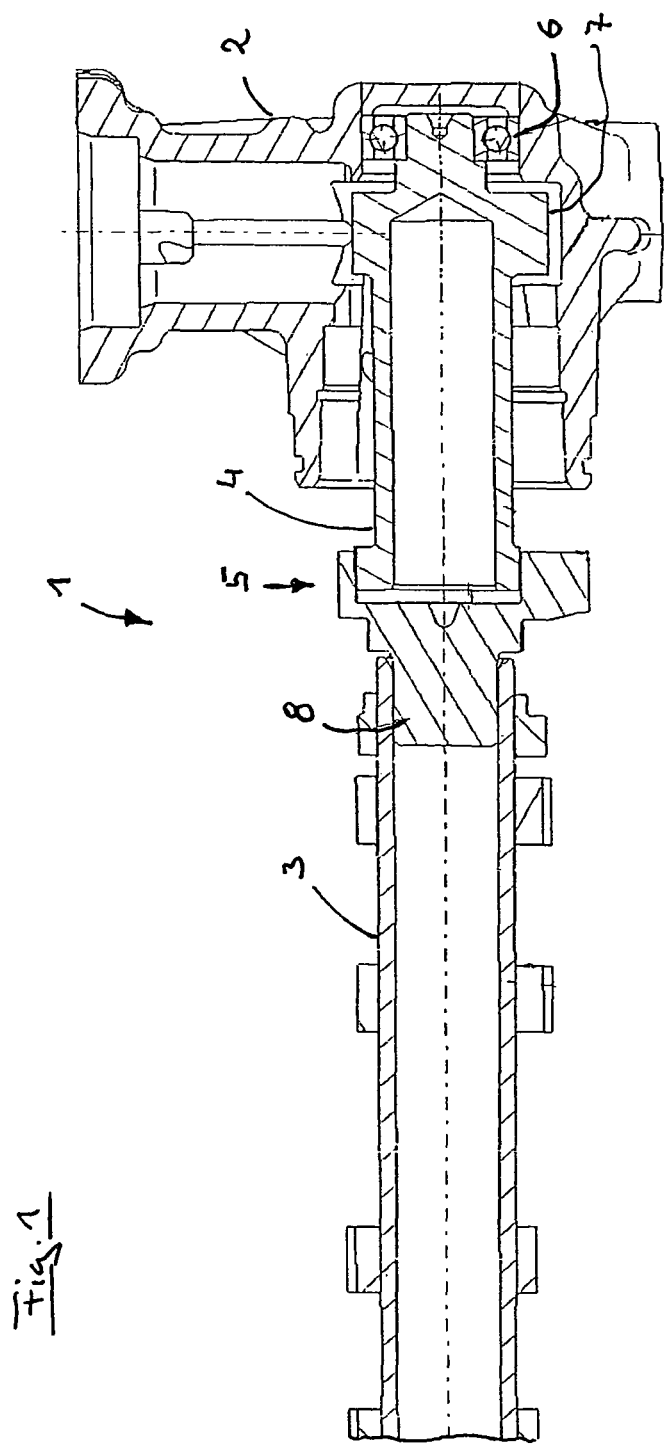
FIG. 1 is a sectional view of a device according to an embodiment of the invention for driving an auxiliary unit.

FIG. 1 is a sectional view of an exemplary device 1 according to the invention for driving an auxiliary unit 2. A driveshaft 3—in the present embodiment, a camshaft of an internal-combustion engine (not shown)—is provided for driving the auxiliary unit 2. In the present embodiment, the camshaft is hollow with a shrunk-on cam. Further embodiments may, for example, involve a crankshaft or any other driveshaft of the internal-combustion engine.

On a face end, the driveshaft 3 has a driveshaft-side coupling element 8, which is non-rotatably connected with the driveshaft 3. In a further embodiment, the driveshaft-side coupling element 8 may also be formed by the driveshaft 3 itself. The driveshaft-side coupling element 8 represents one side of a coupling 5, with a shaft end having an interior profile, a unit shaft 4 of the auxiliary unit 2 having an exterior profile complementary to this interior profile. Particularly preferably, the interior and the exterior profiling is a polygonal profile.

In the present embodiment, the auxiliary unit 2 is a high-pressure pump, which has a bearing 6 for the unit shaft 4. The bearing 6 is arranged on the side opposite the driveshaft 3, which, in the present embodiment, is a deep-groove ball bearing. In addition, the unit shaft 4 has a cam 7 for operating the high-pressure pump.

The unit shaft 4 has the first bearing 6 on the side facing away from the coupling 5, which coupling 5 is a second bearing for the unit shaft 4.

Accordingly, a static redundancy will therefore be avoided as a result of the bearings 5, 6.

In the present embodiment, the unit shaft 4 has the cam 7, which generates an alternating torque during the operation of the device, in which case, particularly preferably, the polygonal profile corresponds with this alternating torque. This means that the polygonal profile is oriented such that the alternating torque is eliminated as much as possible.

In a further embodiment, only the driveshaft 3 may have a cam, in which case, the polygonal profile also corresponds with this alternating torque.

Particularly preferably, the shaft end having the exterior profile has a circumferential radius in the axial direction, whereby a tolerance compensation in the axial direction or an angular tolerance compensation becomes possible. In the particularly preferred embodiment, the auxiliary unit 2 is a high-pressure fuel pump.

A coupling solution having a polygonal profile is therefore provided for coupling a driveshaft 3, for example, an intake or exhaust camshaft, a crankshaft, etc. and a unit shaft 4, such as a driveshaft of a high-pressure pump, in which case the coupling simultaneously takes over the bearing of one side of the unit shaft 4.

The unit shaft 4 is normally shaped as a camshaft. The lateral forces arising at the cam 7 are absorbed by the separate bearing 6 and the coupling 5. By means of the lateral forces, the coupling that is subject to play is always pressed onto a defined contact stop, which has acoustic advantages. In the case of a simultaneous radial loading, for example, by means of a pump tappet, onto a cam provided on the shaft, an acoustically advantageous rolling movement takes place during the change of the torque within the scope of the play between the driveshaft-side coupling element 8 and the unit shaft 4. The bearing 5 may have a polygonal profile with three, four or two corners, preferably corresponding to the number of pump lobe elevations or to a different number. This embodiment can preferably be combined with the simultaneous radial loading of the driven shaft by the construction of the polygonal profile by two tangentially adjoining radii. The coupling 5 thereby becomes tolerant with respect to the offset angle of the shafts 3, 4 as a result of a preferably crowned construction by means of the circumferential radius.

Figure 2:
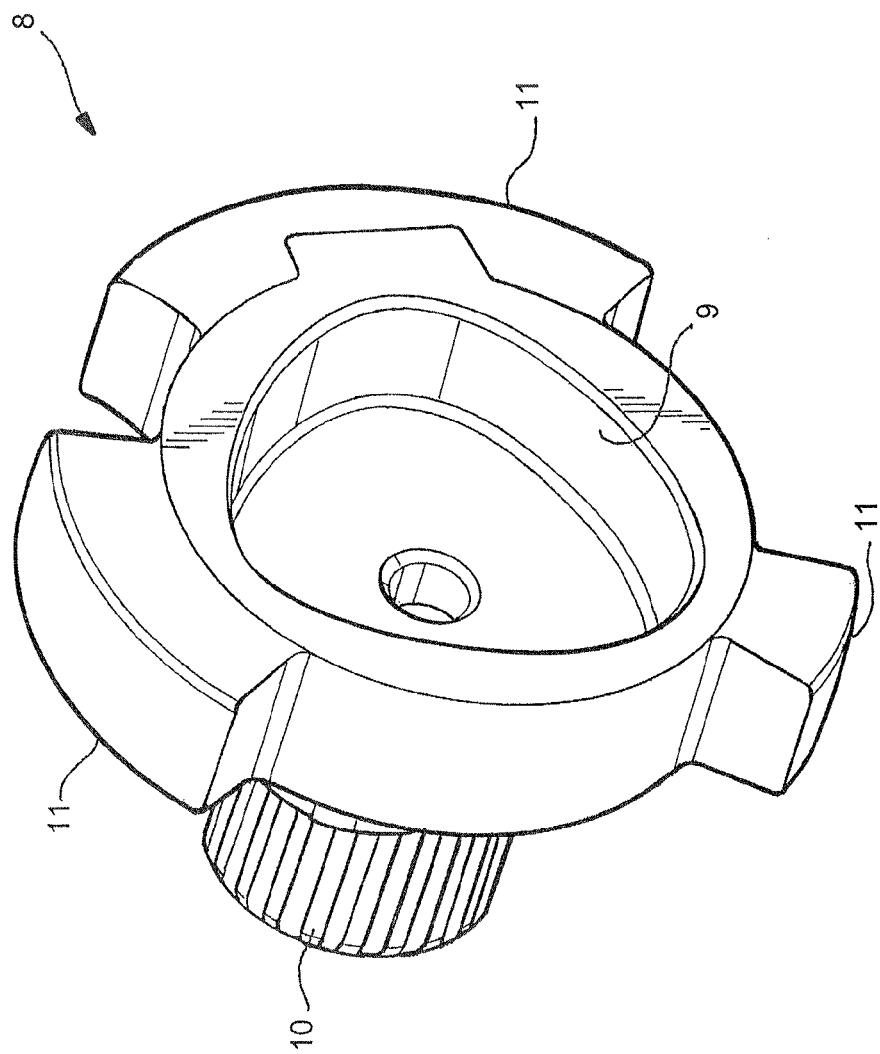
FIG. 2 is a three-dimensional top view of an exemplary coupling element on the driveshaft side.

FIG. 2 is a three-dimensional top view of the driveshaft-side coupling element 8 with a shaft end 9 having an interior profile, in this embodiment having a polygonal profile, into which the corresponding exterior polygonal profile of the unit shaft 4 can be inserted. Furthermore, in this embodiment, the driveshaft-side coupling element 8 has three raised areas 11, on the basis of which a sensor, which is not shown, can detect the absolute angular position of the driveshaft 3. On the side facing away from the shaft end 9 with the interior profile, the driveshaft-side coupling element 8 has an exterior profile 10 which is used as an anti-twist protection between the driveshaft-side coupling element 8 and the driveshaft 3.

By means of the further development according to the invention, a cost-effective, acoustically inconspicuous, tolerance-insensitive coupling solution is achieved for using, for example, a high-pressure pump camshaft on an existing intake or exhaust camshaft or any other shaft.

LIST OF REFERENCE NUMBERS

1 Device
2 Auxiliary unit
3 Driveshaft
4 Unit shaft
5 Coupling
6 Bearing
7 Cam
8 Driveshaft-side coupling element
9 Shaft end having an interior profile
10 Exterior profile
11 Raised area The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for driving an auxiliary unit by a rotatably disposed drive shaft of an internal-combustion engine, the device comprising:
   a unit shaft supported at least partially in an auxiliary unit housing of the auxiliary unit;
   a coupling by which the drive shaft and the unit shaft are coupled, the coupling being formed by coupling elements that are at least one of coupled to at least one of the drive shaft and the unit shaft and integrally formed with at least one of the drive shaft and the unit shaft; and
   a first bearing arranged on an end of the unit shaft opposite an end of the unit shaft at which the coupling is located, wherein
      the coupling further serves as a second bearing of the unit shaft at the end of the unit shaft adjacent to the coupling, and
      the unit shaft has at least one cam located between the first bearing and the coupling.

2. The device according to claim 1, wherein the auxiliary unit is a fuel pump.

3. The device according to claim 1, wherein the coupling comprises a first shaft end having an interior profile and a second shaft end having an exterior profile, wherein the first shaft end interior profile and the second shaft end exterior profile are complementary to one another.

4. The device according to claim 3, wherein the complementary interior and exterior profiles are generally polygonal profiles.

5. The device according to claim 4, and said generally polygonal profiles are arranged on the first and second shaft ends such that at least one corner of the generally polygonal exterior profile is oriented such that an alternating torque generated by said at least one corner minimizes the alternating torque of the at least one cam.

6. The device according to claim 3, wherein the shaft end with the exterior profile has a circumferential radius in an axial direction.

7. The device according to claim 4, wherein the shaft end with the exterior profile in axial cross-section has a radius in an axial direction.

8. The device according to claim 5, wherein the shaft end with the exterior profile in axial cross-section has a radius in an axial direction.

* * * * *